L. H. DECKER.
Fanning-Mills.
No. 143,127. Patented September 23, 1873.
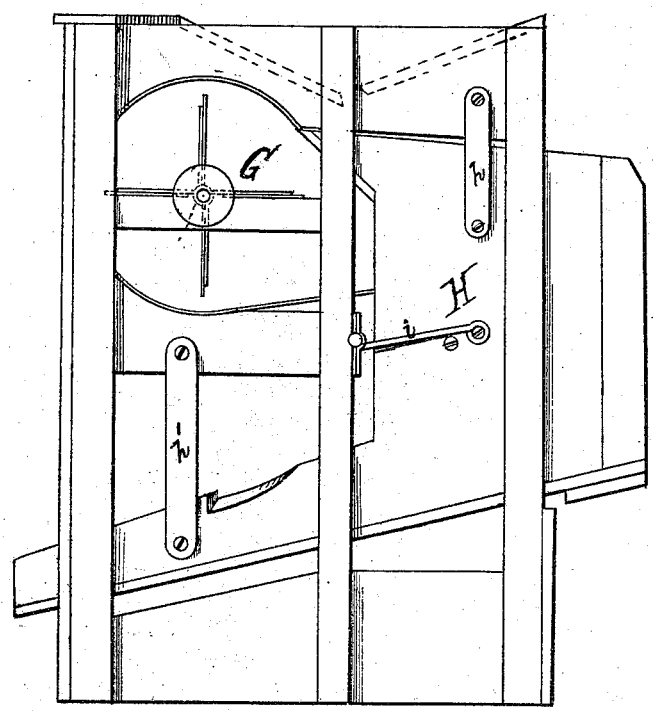
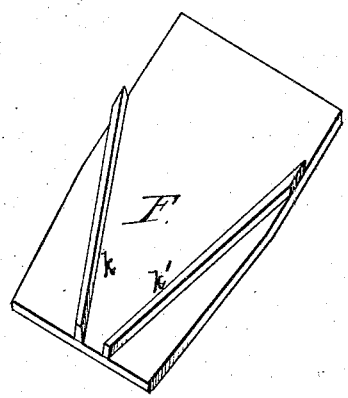
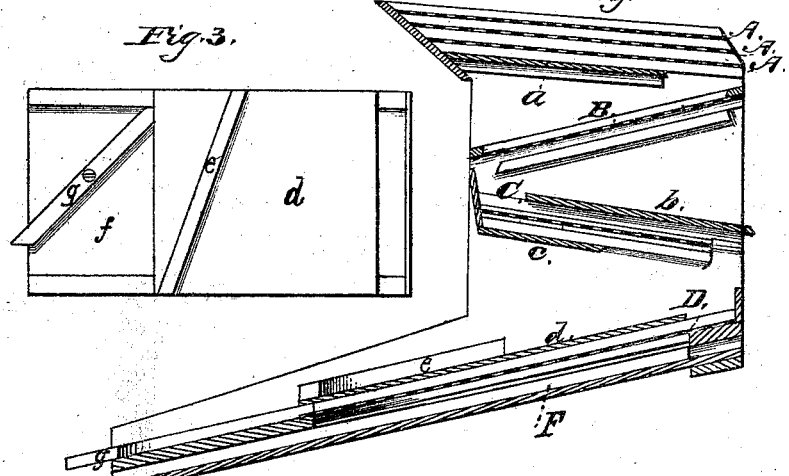

UNITED STATES PATENT OFFICE.

LYMAN H. DECKER, OF GROVE LAKE, ASSIGNOR OF ONE-HALF HIS RIGHT TO THOMAS BOLLES, OF SAUK CENTRE, MINNESOTA.

IMPROVEMENT IN FANNING-MILLS.

Specification forming part of Letters Patent No. 143,127, dated September 23, 1873; application filed July 8, 1872.

*To all whom it may concern:*

Be it known that I, LYMAN H. DECKER, of Grove Lake, Stearns county, Minnesota, have invented certain new and useful Improvements in Fanning-Mills, of which the following, taken in connection with the drawings forming part thereof, is a full and clear description.

My invention relates to reciprocating fanning-mills; and consists in the novel arrangement and combination, in and with the shoe, of screens and chute-boards, as will the more fully appear in the description and claim.

In the drawings, Figure 1 is a side view of a fanning-mill. Fig. 2 is a vertical section of a shoe showing my invention. Fig. 3 is a plan view of the chute-board $d$ and delivering-spout; Fig. 4, a plan view of a movable board, passing from the lower end of sieve B to the lower end of sieve D, to be used only when absolute cleanliness is not necessary.

A A A is the upper gang of sieves, made of perforated zinc, or the usual wire-cloth for such purposes, the perforations in the zinc, and the meshes in the wire-sieves, being only large enough to pass the seed or grain through, the chaff and coarse matter sliding off the lower end. This gang inclines from rear to front, and underneath it, nearly to the front, extends the chute-board $a$.

The grain, passing through A A A, is all carried to the head of the next sieve, B, which is of finer mesh, and inclined from front to rear. In falling from the board A onto B, the grain is subjected to the blast from fan G, which blows out the light matters. The sieve B is arranged so that the grain passing down it will fall from its lower end onto the sieve C. The screenings, which pass through B, fall onto the chute or blank board $b$, and pass off at the front of the mill.

The sieve C slants in a reverse direction to B, and is provided, at its upper end, with the guide-board $c$, extending to about the plane of B, so as to guide the grain onto C. Underneath it is the chute-board $c$, upon which fall the screenings from C, and which then fall onto the board $d$ over sieve D. The lower end of C does not extend quite to the front of the shoe, so that the grain falling therefrom shall fall upon the sieve D. This sieve D is constructed with a blank at its lower end, upon which is pivoted the guide-piece $g$. By this device the grain passing down D can be deflected to a receptacle at one corner of the mill; or may be allowed to pass off at the entire end. Over the screen D is placed the blank or chute board $d$. Upon this the screenings from $c$ fall, and are conducted, by the guide-strip $e$, out at one side of the mill. These sieves, blanks, and chutes are all supported in the shoe H, which is suspended in the frame of the mill by straps $h\ h$; and receive a reciprocating and oscillating motion by means of pitmen $i\ i$, which connect with a shaft revolved by a spur-wheel, and is connected with the fan-shaft by a band or belt.

By this arrangement I am enabled to furnish a larger area of cleaning-surface without enlarging the ordinary size of fanning-mills, and to clean the grain rapidly and thoroughly.

What I claim as new, and desire to secure by Letters Patent, is—

1. The combination, in and with the shoe H, of the gang of sieves A A A, sieves B, C, and D, and blank and chute boards $a$, $b$, $c$, $d$, and F, arranged substantially as and for the purposes set forth.

2. The screen D, having blank $d$ and guide-strip $e$, blank $f$, and guide $g$, constructed substantially as and for the purposes set forth.

LYMAN H. DECKER.

Witnesses:
HENRY A. MAYO,
J. D. CASE.